United States Patent
Mahna et al.

(10) Patent No.: US 11,836,173 B2
(45) Date of Patent: Dec. 5, 2023

(54) APPARATUS AND METHOD FOR GENERATING A SCHEMA

(71) Applicant: Banjo Health Inc., Washington, DC (US)

(72) Inventors: Saaransh Mahna, Northborough, MA (US); James Rollins, Fredericksburg, VA (US); Shannon Fee, San Francisco, CA (US); Randy Ulloa, Farmington, CT (US); Erika Granger, Oakland, CA (US); Jimmy Lin, Washington, DC (US)

(73) Assignee: Banjo Health Inc., Washington, DC (US)

( * ) Notice: Subject to any disclaimer, the term of this patent is extended or adjusted under 35 U.S.C. 154(b) by 0 days.

(21) Appl. No.: 17/825,006

(22) Filed: May 26, 2022

(65) Prior Publication Data
US 2022/0382722 A1    Dec. 1, 2022

Related U.S. Application Data

(60) Provisional application No. 63/193,267, filed on May 26, 2021.

(51) Int. Cl.
| | | |
|---|---|---|
| G06F 40/00 | (2020.01) | |
| G06V 30/41 | (2022.01) | |
| G06V 10/82 | (2022.01) | |
| G06F 40/30 | (2020.01) | |
| G06F 16/33 | (2019.01) | |
| G06F 16/2457 | (2019.01) | |
| G06F 18/214 | (2023.01) | |

(52) U.S. Cl.
CPC ...... *G06F 16/3346* (2019.01); *G06F 16/2457* (2019.01); *G06F 18/214* (2023.01); *G06F 40/00* (2020.01)

(58) Field of Classification Search
CPC .. G06F 16/3346; G06F 16/2457; G06F 40/00; G06K 9/6256
USPC ........................................................ 715/825
See application file for complete search history.

(56) References Cited

U.S. PATENT DOCUMENTS

| | | | | |
|---|---|---|---|---|
| 8,122,005 | B1* | 2/2012 | Juang | G06F 16/353 |
| | | | | 707/706 |
| 9,483,740 | B1* | 11/2016 | Ansel | G06F 40/284 |
| 11,275,903 | B1* | 3/2022 | McInnis | G06F 40/56 |
| 2010/0057718 | A1* | 3/2010 | Kulkarni | G06F 16/951 |
| | | | | 707/E17.071 |
| 2011/0119212 | A1* | 5/2011 | De Bruin | A61B 5/00 |
| | | | | 706/12 |
| 2013/0117280 | A1* | 5/2013 | Donaldson | G06F 16/17 |
| | | | | 707/754 |
| 2013/0297554 | A1* | 11/2013 | Mah | G06N 5/04 |
| | | | | 706/52 |

(Continued)

*Primary Examiner* — Shahid K Khan
*Assistant Examiner* — Ahamed I Nazar
(74) *Attorney, Agent, or Firm* — CALDWELL INTELLECTUAL PROPERTY LAW

(57) ABSTRACT

An apparatus and method for generating a schema, the apparatus comprising at least a processor and a memory communicatively connected to the at least a processor, the memory containing instructions configuring the at least a processor to display, at a graphical control interface, a content field window, receive, as a function of the content field window, a criterion element, and generate a schema as a function of the criterion element.

20 Claims, 12 Drawing Sheets

(56) References Cited

U.S. PATENT DOCUMENTS

| | | | |
|---|---|---|---|
| 2018/0211725 A1* | 7/2018 | Purdie | G16H 10/60 |
| 2020/0285912 A1* | 9/2020 | Brebner | G06N 20/00 |
| 2021/0097339 A1* | 4/2021 | Agrawal | G06N 7/005 |
| 2022/0300711 A1* | 9/2022 | Elisco | G06F 40/205 |
| 2023/0123574 A1* | 4/2023 | Guberman | G06N 20/20 |
| | | | 704/9 |

* cited by examiner

APPARATUS AND METHOD FOR GENERATING A SCHEMA

CROSS-REFERENCE TO RELATED APPLICATIONS

This application claims the benefit of priority of U.S. Provisional Patent Application Ser. No. 63/193,267, filed on May 26, 2021, and titled "SYSTEM AND METHOD FOR GENERATING A SCHEMA," which is incorporated by reference herein in its entirety.

FIELD OF THE INVENTION

The present invention generally relates to the field of artificial intelligence simulation and modeling. In particular, the present invention is directed to an apparatus and method for generating a schema.

BACKGROUND

In some situations, potential interventions must be filtered prior to deployment. Filtering is often performed manually and may result in undesirable delays before deployment of the intervention. Additionally, filtering of potential interventions abounds with complexity, misidentification, and, as a result, error. Slow and error-laden filtering of potential interventions produce waste and inefficiencies within numerous industries.

SUMMARY OF THE DISCLOSURE

In an aspect, an apparatus for generating a schema is presented. The apparatus comprising at least a processor and a memory communicatively connected to the at least a processor, the memory containing instructions configuring the at least a processor to display, at a graphical control interface, a content field window, receive, as a function of the content field window, a criterion element, and generate a schema as a function of the criterion element. Generating the schema further comprises identifying at least a significant term as a function of the criterion element, receiving at least a training example, training a machine-learning model as a function of the at least a training example, and generating the schema as a function of the criterion element and the machine-learning model.

In an aspect, a method for generating a schema, the method comprising displaying, at a graphical control interface, a content field window, receiving, as a function of the content field window, a criterion element, and generating a schema as a function of the criterion element, wherein generating the schema further comprises identifying at least a significant term as a function of the criterion element, receiving at least a training example, training a machine-learning model as a function of the at least a training example, and generating the schema as a function of the criterion element and the machine-learning model.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for generating a schema. In an embodiment, this disclosure can receive a criterion element as a function of a user input. Aspects of the present disclosure can train a machine-learning model using the criterion element. This is so, at least in part, because this disclosure identifies significant terms as a function of the criterion element and trains the machine-learning model with the significant terms. Aspects of the present disclosure allow for producing a schema and/or a decision tree to reduce the complexity in decision making processes. Exemplary embodiments illustrating aspects of the present disclosure are described below in the context of several specific examples.

Figure 1:
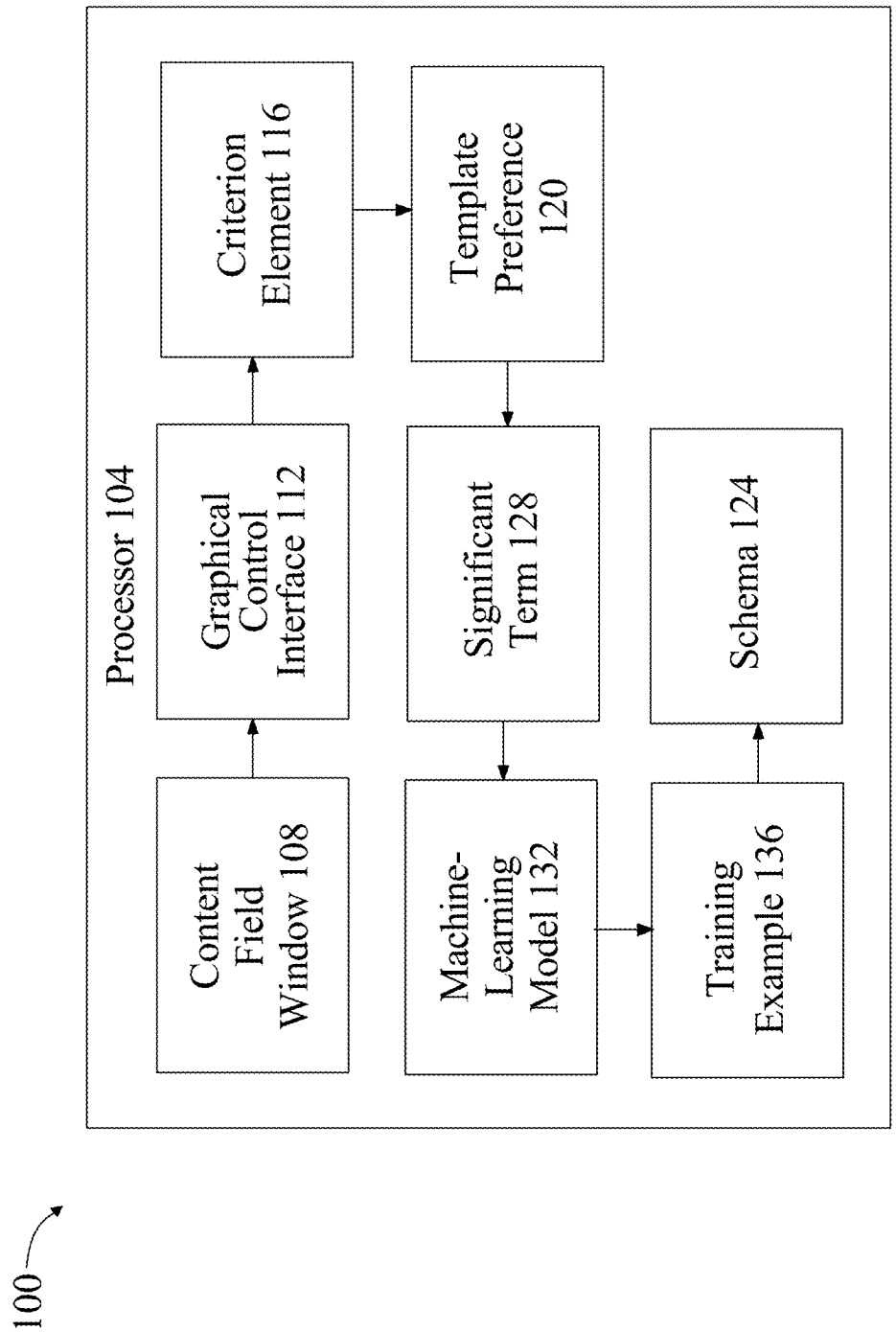
FIG. 1 is a block diagram illustrating an exemplary embodiment of an apparatus for generating a schema.

Now referring to FIG. 1, apparatus 100 for generating a schema is presented. Apparatus 100 includes a processor 104 and possibly a memory communicatively connected to processor 104, wherein memory contains instructions configuring processor 104 to carry out the verifying process. Processor 104 and memory may be contained in a computing device. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. A computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of apparatus 100 and/or computing device.

With continued reference to FIG. 1, processor 104 and/or computing device may be designed and/or configured by memory to perform any method, method step, or sequence of method steps in any embodiment described in this disclosure, in any order and with any degree of repetition. For instance, processor 104 and/or computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 and/or computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Processor 104 and/or computing device may perform determinations, classification, and/or analysis steps, methods, processes, or the like as described in this disclosure using machine learning processes. A "machine learning process," as used in this disclosure, is a process that automatedly uses a body of data known as "training data" and/or a "training set" (described further below) to generate an algorithm that will be performed by a computing device/module to produce outputs given data provided as inputs; this is in contrast to a non-machine learning software program where the commands to be executed are determined in advance by a user and written in a programming language. Machine-learning process may utilize supervised, unsupervised, lazy-learning processes and/or neural networks, described further below.

Still referring to FIG. 1, at least a processor 104 is configured to display a content field window 108. Criterion element 116 may further be received as a function of content field window 108. As used in this disclosure a "content field window" is a window and/or field that allows a user to enter criterion element 116. For example, and without limitation, content field window 108 may include one or more text boxes, text fields, text entry boxes, and the like thereof. As a further non-limiting content field window 108 may include one or more drop down menus, buttons, and/or selection options. In an embodiment, and without limitation, producing content field window 108 may include generating a free-form field window. As used in this disclosure a "free-form field window" is one or more field windows that allow a user and/or medical professional to enter criterion element 116 without guidance. For example, and without limitation, free-form template may include one or more unrestricted and/or free field windows for a user to enter criterion element 116. In an embodiment, and without limitation, content field window 108 may include a structured field window. As used in this disclosure a "structured field window" is one or more guided field windows that aid a user and/or medical professional to enter criterion element 116 in an appropriate location and/or format. For example, and without limitation, structured field window may include one or more guidelines and/or suggestions for a user to enter appropriate criterion elements such as names, diagnosis, drug codes, therapeutic codes, and the like thereof. In an embodiment, and without limitation, structured field window may include a plurality of structured models. As used in this disclosure a "structured model" is a graphical representation of a structure and/or flow path of the criterion elements. For example, and without limitation, structured model may include one or more decision trees and/or flow paths that aid a user in entering criterion element 116. In an embodiment, and without limitation, at least a processor 104 receives criterion element 116 as a function of content field window 108. For example, and without limitation, a user may enter one or more criterion elements in content field window 108, wherein at least a processor 104 receives the criterion elements as a function of the user input in the content field window 108.

Referring still to FIG. 1, content field window 108 is displayed at a graphical control interface 112. As used in this disclosure a "graphical control interface" is a user interface comprising a graphical and/or pictorial representation. For example, and without limitation, graphical control interface 112 may include displaying on display window and/or client device a graphical user interface to allow a user and/or medical professional to select an icon, entering a textual string of data, selecting a text box, verbally confirming, and the like thereof. In an embodiment, and without limitation, graphical control interface 112 may be display on a display window. As used in this disclosure a "display window" is a portion of a display of a user device and/or at least a processor 104 to display graphical control interface 112. Display window may be a window that ordinarily displays content when a template preference 120 is selected. Display window may be configurable using executables, scripting languages, markup languages, and the like, including without limitation HTML, extensible stylesheet language transformations (XSLT), JavaScript, applets, and the like thereof.

Still referring to FIG. 1, apparatus 100 is configured to receive a criterion element 116 as a function of the content field window 108. As used in this disclosure a criterion element 116. As used in this disclosure a "criterion element" is an element of datum denoting a parameter and/or identifier associated with a medical record. For example, and without limitation, criterion element 116 may include a user's name. As a further non-limiting example, criterion element 116 may include a treatment plan for a medical condition. As a further non-limiting example, criterion element 116 may include a time and/or time period required to treat the medical condition, wherein a time period is any temporal window such as, but not limited to seconds, minutes, hours, days, weeks, months, years, and the like thereof. As a further non-limiting example, criterion element 116 may include a time and/or date the criteria was entered. As a further non-limiting example, criterion element 116 may include a drug and/or chemical name such as, but not limited to drugs such as Dupixient, Tylenol, Metformin, and the like thereof. As a further non-limiting example, criterion element 116 may include a diagnosis of a medical condition. As a further non-limiting example, criterion element 116 may include a therapeutic major class code, such as "0100", "0300", "0700", and the like thereof. As a further non-limiting example, criterion element 116 may include a therapeutic subclass code such as "0117", "0346", "0876", and the like thereof. In any embodiment, and without limitation, criterion element 116 may include any additional datum denoting information relating to one or more medical parameters and/or identifiers.

Still referring to FIG. 1, in some embodiments, criterion element 116 may be received from a document using optical character recognition (OCR). Optical character recognition or optical character reader (OCR) includes automatic conversion of images of written (e.g., typed, handwritten or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

Still referring to FIG. 1, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning process like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIG. 5. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, Calif., United States.

Still referring to FIG. 1, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, for example neural networks as taught in reference to FIG. 2.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

Still referring to FIG. 1, displaying a content field window 108 further includes identifying a template preference 120 as a function of the graphical control interface 112. As used in this disclosure a "template preference" is a preferred and/or desired template to enter criterion element 116. In an embodiment, and without limitation, template preference 120 may be identified by at least a processor 104, a user, and/or a medical professional. For example, and without limitation, template preference 120 may denote one or more desired for a free-form field window and/or a structured field window as described below in detail. In an embodiment, at least a processor 104 identifies template preference 120 as a function of a graphical control interface 112. Identifying template preference 120 further comprises presenting graphical control interface 112 to the user. At least a processor 104 may then receive a user preference from the user. Template preference 120 may be identified as a function of the user preference. At least a processor 104 may receive a user preference as a function of the presented graphical control interface 112. As used in this disclosure a "user preference" is a user defined wish and/or desire to enter criterion element 116 in a particular manner. For example, and without limitation, user preference may denote that a user wishes to enter criterion element 116 using a free-form template, wherein at least a processor 104 preferred and/or defaulted to a structured template, and wherein the user preference supersedes the default and/or preference of at least a processor 104.

Still referring to FIG. 1, at least a processor 104 may receive criterion element 116 as a function of a user input. As used in this disclosure a "user input" is an entry and/or communication generated by the user and/or medical professional, wherein an "medical professional," as used herein, is an individual that is skilled in the health and wellness field. As a non-limiting example a medical professional may include a medical professional who may assist and/or participate in a medical activity of an individual such as, but not limited to psychiatrists, psychologists, endocrinologist, psychotherapists, family physicians, gastroenterologists, internists, oncologists, pediatricians, cardiologists, geneticists, neurologists, physical therapists, primary care providers, and the like thereof. is a user that has an elevated. For example, and without limitation, user input may include a diagnostic element. As used in this disclosure a "diagnostic element" is an element of datum denoting a medical diagnosis of an individual. For example, and without limitation, user input may include an input denoting a user is diagnosed with diabetes, high blood pressure, chronic obstructive pulmonary disease, and the like thereof. User input includes a diagnostic element. As used herein, a "diagnostic element" is an element of data containing information concerned with the diagnosis of illness or other problems. Diagnostic element may include if the user has any diagnoses or symptoms of illnesses. For example, but without limitation, diagnostic element may include that the user has been diagnosed with rheumatoid arthritis, is susceptible to be diagnosed with colon cancer due to family history, is showing symptoms commonly associated with leukemia, or the like.

Continuing to refer to FIG. 1, receiving criterion element 116 may further comprise selecting a therapeutic. As used in this disclosure a "therapeutic" is a treatment and/or therapy for a diagnosis and/or medical condition. For example, and without limitation, therapeutic may include one or more drugs, surgeries, diets, and the like thereof. In an embodiment, therapeutic may be selected from a therapeutic database. In an embodiment, therapeutic database may be implemented, without limitation, as a relational database, a key-value retrieval database such as a NOSQL database, or any other format or structure for use as a database that a person skilled in the art would recognize as suitable upon review of the entirety of this disclosure. Therapeutic database may alternatively or additionally be implemented using a distributed data storage protocol and/or data structure, such as a distributed hash table or the like. Therapeutic database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure. For example, and without limitation, therapeutic database may include data comprising therapeutic major codes, therapeutic subclass codes, drug name codes, drug names, and the like thereof. Moreover, therapeutic may be selected from a therapeutic database. Therapeutic database may be implemented, without limitation, as a relational database, a key-value retrieval database such as a NOSQL database, or any other format or structure for use as a therapeutic database that a person skilled in the art would recognize as suitable upon review of the entirety of this disclosure. Therapeutic database may alternatively or additionally be implemented using a distributed data storage protocol and/or data structure, such as a distributed hash table or the like. Therapeutic database may include a plurality of data entries and/or records as described above. Data entries in a therapeutic database may be flagged with or linked to one or more additional elements of information, which may be reflected in data entry cells and/or in linked tables such as tables related by one or more indices in a relational therapeutic database. Persons skilled in the art, upon reviewing the entirety of this disclosure, will be aware of various ways in which data entries in a therapeutic database may store, retrieve, organize, and/or reflect data and/or records as used herein, as well as categories and/or populations of data consistently with this disclosure. In some embodiments, network data, or other information such as user information, transfer party information, and alimentary provider information, may be stored in and/or retrieved from therapeutic database.

Still referring to FIG. 1, at least a processor 104 is configured to produce a schema 124 as a function of criterion element 116. As used in this disclosure a "schema" is a diagram and/or chart that aids in determining a course of action. In an embodiment, and without limitation, schema may be configured to present and/or depict a statistical probability. In an embodiment, schema 124 may include one or more decision trees to outline a plurality of decisions for a user and/or medical professional to select and/or follow. For example, and without limitation, schema 124 may denote one or more statistical probabilities for making a first and/or second decision along a decision tree, wherein the statistical probability may denote a confidence interval. As used in this disclosure a "confidence interval" is a range of values that specify a probability that the value lies within the parameters denoted by the range of values. For example, and without limitation, a confidence interval may denote that a first decision has a 95% likelihood of being correct, wherein a second decision has a 32% likelihood of being correct. In another embodiment, and without limitation schema 124 may aid in identifying prior authorization of a medical procedure and/or prescription as a function of a decision tree and statistical probability. In an embodiment, and without limitation, producing schema 124 may be an iterative process as a function of receiving a current criterion element 116.

Referring still to FIG. 1, at least a processor 104 may identifying at least a significant term 128 as a function of criterion element 116. As used in this disclosure a "significant term" is any string of symbols, text, and/or depictions that represent one or more objects and/or entities that influence a medical decision. In addition to single words made of letters in the conventional sense, the meaning of "term" as used herein includes without limitation a phrase made of such words, a sequence of nucleotides described by AGTC notation, any string of numerical digits, and any string of symbols whether their meanings are known or unknown to any person. As a non-limiting example, significant term 128 may include terms associated with drugs, therapeutics, diagnoses, lifestyle health, medical records, biological history, physical activity, contractual obligations, transactions, decisions, and the like thereof. In an embodiment, and without limitation, significant term 128 may include one or more Boolean operators, such as terms including but not limited to, "AND", "OR", "NOT", and the like thereof. At least a processor 104 may then train machine-learning model 132 as a function of at least a significant term 128.

Still referring to FIG. 1, at least a processor 104 may be configured to generate a vector for at least a significant term 128. As used in this disclosure a "vector" as defined in this disclosure is a data structure that represents one or more quantitative values and/or measures significant terms. A vector may be represented as an n-tuple of values, where n is one or more values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. A two-dimensional subspace of a vector space may be defined by any two orthogonal vectors contained within the vector space. A vector's "norm' is a scalar value, denoted ‖a‖ indicating the vector's length or size, and may be defined, as a non-limiting example, according to a Euclidean norm for an n-dimensional vector a as:

$$\|a\| = \sqrt{\sum_{i=0}^{n} a_i^2}$$

Still referring to FIG. 1, for the purposes of this disclosure a vector is "normalized' if it has been turned into a vector of length 1, or "unit vector" by scalar-multiplying the vector with the multiplicative inverse of its norm. In other words, a vector is normalized by the formula $$\frac{a}{\|a\|}.$$

In an embodiment, and with continued reference to FIG. 1, each unique extracted and/or other language element may be represented by a dimension of a vector space; as a non-limiting example, each element of a vector may include a number representing an enumeration of co-occurrences of the significant term 128 and/or language element represented by the vector with another significant term 128, and/or language element. Alternatively or additionally, dimensions of vector space may not represent distinct terms, in which case elements of a vector representing a first term may have numerical values that together represent a geometrical relationship to a vector representing a second term, wherein the geometrical relationship represents and/or approximates a semantic relationship between the first term and the second term. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity. As used in this disclosure "cosine similarity" is a measure of similarity between two-non-zero vectors of a vector space, wherein determining the similarity includes determining the cosine of the angle between the two vectors. Cosine similarity may be computed as a function of using a dot product of the two vectors divided by the lengths of the two vectors, or the dot product of two normalized vectors. For instance, and without limitation, a cosine of 0° is 1, wherein it is less than 1 for any angle in the interval (0,π) radians. Cosine similarity may be a judgment of orientation and not magnitude, wherein two vectors with the same orientation have a cosine similarity of 1, two vectors oriented at 90° relative to each other have a similarity of 0, and two vectors diametrically opposed have a similarity of −1, independent of their magnitude. As a non-limiting example, vectors may be considered similar if parallel to one another. As a further non-limiting example, vectors may be considered dissimilar if orthogonal to one another. As a further non-limiting example, vectors may be considered uncorrelated if opposite to one another. Additionally or alternatively, degree of similarity may include any other geometric measure of distance between vectors.

Still referring to FIG. 1, each vector may represent a semantic relationship between at least a significant term 128 and a semantic unit in criterion element 116. As used in this disclosure a "semantic relationship" is a relationship between the at least a significant term 128 and a semantic unit in criterion element 116. As a non-limiting example, semantic relationships may include associations between the meanings of phrases, sentences, paragraphs, essays, novels, and/or written documents. Additionally and/or alternatively semantic relationships may include, without limitation, synonymy, antonymy, homonymy, polysemy, and/or metonymy. As used in this disclosure "semantic units" are words, phrases, sentences, and/or "n-grams" of words, defined as a set of n words appearing contiguously in a text. As a non-limiting example, semantic units may include one or more words, wherein words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data. Textual data may be parsed into tokens, which may include a simple word (sequence of letters separated by whitespace) or more generally a sequence of characters as described previously, as delineated by one or more separating characters such as spaces, punctuation or the like. The term "token," as used herein, refers to any smaller, individual groupings of text from a larger source of text; tokens may be broken up by word, pair of words, sentence, or other delimitation. These tokens may in turn be parsed in various ways. Textual data may be parsed using tokens into semantic units such as words or sequences of words as described above. Any or all possible sequences of tokens or words may be stored as "chains", for example for use as a Markov chain or Hidden Markov Model, to generate semantic units.

At least a processor 104 may represent semantic relationships by generating a matrix. As used in this disclosure "matrix" is a rectangular array or table of numbers, symbols, expressions, vectors, and/or representations arranged in rows and columns. For instance, and without limitation, matrix may include rows and/or columns comprised of vectors representing terms, where each row and/or column is a vector representing a distinct term; terms represented by vectors in matrix may include all semantic units as described above as derived from criterion element 116, including without limitation significant terms as described above. As a non-limiting example matrix may include semantic relationships associated with diabetes, metformin, elevated triglycerides, and the like thereof. Matrix may be generated by performing a singular value decomposition function. As used in this disclosure a "singular value decomposition function" is a factorization of a real and/or complex matrix that generalizes the eigen decomposition of a square normal matrix to any matrix of m rows and n columns via an extension of the polar decomposition. For example, and without limitation singular value decomposition function may decompose a first matrix, A, comprised of m rows and n columns to three other matrices, U, S, T, wherein matrix U, represents left singular vectors consisting of an orthogonal matrix of m rows and m columns, matrix S represents a singular value diagonal matrix of m rows and n columns, and matrix $V^T$ represents right singular vectors consisting of an orthogonal matrix of n rows and n columns according to the function:

$$A_{m \times n} = U_{m \times m} S_{m \times n} V_{n \times n}^T$$

Still referring to FIG. 1, singular value decomposition function may find eigenvalues and eigenvectors of $AA^T$ and $A^T A$. The eigenvectors of ATA may include the columns of $V^T$, wherein the eigenvectors of $AA^T$ may include the columns of U. The singular values in S may be determined as a function of the square roots of eigenvalues $AA^T$ or $A^T A$, wherein the singular values are the diagonal entries of the S matrix and are arranged in descending order. Singular value decomposition may be performed such that a generalized inverse of a non-full rank matrix may be generated.

Continuing to refer to FIG. 1, generating a schema 124 further includes training a machine-learning model 132 as a function of at least a training example 136. As used in this disclosure a "machine-learning model" is a machine-learning model to produce a schema given criterion elements and/or significant terms 128 as inputs, wherein significant terms 128 are described below in detail; this is in contrast to a non-machine learning software program where the commands to be executed are determined in advance by a user and written in a programming language. Machine-learning model 132 may include one or more machine-learning processes such as supervised, unsupervised, or reinforcement machine-learning processes that at least a processor 104 and/or a remote device may or may not use in the production of schema 124. As used in this disclosure "remote device" is an external device to at least a processor 104. Machine-learning process may include, without limitation machine learning processes such as simple linear regression, multiple linear regression, polynomial regression, support vector regression, ridge regression, lasso regression, elastic net regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

Still referring to FIG. 1, at least a processor 104 may train machine-learning model 132 by performing named entity recognition as a function of criterion element 116. As used in this disclosure "named entity recognition" is a subtask of information extraction that seeks to locate and classify named entities mentioned in unstructured text into pre-defined categories. Pre-defined categories may include, without limitation, categories such as person names, organizations, locations, medical codes, time expressions, quantities, monetary values, percentages, and the like thereof. In an embodiment, one or more categories may be enumerated, to find total count of mentions in such documents. At least a processor 104 may configure machine-learning model 132 to performed named entity recognition by extracting, from one or more criterion elements, one or more words and/or other semantic units. As a non-limiting example, machine-learning model 132 may perform named entity recognition to at least compare extracted significant terms 128 to semantic units.

Still referring to FIG. 1, machine-learning model 132 may perform named entity recognition by producing a language processing model. Language processing model may include a program automatically generated by at least a processor 104 and/or named entity recognition to produce associations between one or more significant terms 128 extracted from criterion element 116 and detect associations, including without limitation mathematical associations, between such significant terms 128. Associations between language elements, where language elements include for purposes herein extracted significant terms 128, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted significant term 128 indicates a given category of semantic meaning. As a further example, statistical correlations and/or mathematical associations may include probabilistic formulas or relationships indicating a positive and/or negative association between at least an extracted significant term 128 and/or a given semantic relationship; positive or negative indication may include an indication that a given document is or is not indicating a category semantic relationship. Whether a phrase, sentence, word, or other textual element in criterion element 116 constitutes a positive or negative indicator may be determined, in an embodiment, by mathematical associations between detected significant terms 128, comparisons to phrases and/or words indicating positive and/or negative indicators that are stored in memory at computing device, or the like.

Still referring to FIG. 1, at least a processor 104 may generate the named entity recognition by any suitable method, including without limitation a natural language processing classification algorithm; language processing model may include a natural language process classification model, for instance as generated by training machine-learning model 132, that enumerates and/or derives statistical relationships between input term and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs, as used herein, are statistical models with inference algorithms that that may be applied to the models. In such models, a hidden state to be estimated may include an association between semantic elements such as terms, phrases, tokens, etc. There may be a finite number of categories to which an extracted word may pertain; an HMM inference algorithm, such as the forward-backward algorithm or the Viterbi algorithm, may be used to estimate the most likely discrete state given a word or sequence of words. At least a processor 104 may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Still referring to FIG. 1, at least a processor 104 may use RoBERTa natural language processing. As used herein, "RoBERTa language processing" refers to a robustly optimized method for pretraining natural language processing (NLP) systems that improves on Bidirectional Encoder Representations from Transformers (BERT). The RoBERTa system learns to predict intentionally hidden sections of text within otherwise unannotated language examples. In this disclosure, "BERT" is a transformer-based machine learning technique for natural language processing pre-training developed by Google. BERT masks a same part of a sentence in each Epoch, while, in contrast, RoBERTa uses dynamic masking, wherein for different Epochs different part of the sentences are masked. Furthermore, RoBERTa has key modifications compared to BERT, such as its ability to modify key hyperparameter sin BERT. RoBERTa language processing may be trained on BookCorpus, or any other type of data set as explained herein.

Referring still to FIG. 1, at least a processor 104 may use a language processing module. Language processing module may include any hardware and/or software module. Language processing module may be configured to extract, from the one or more documents, one or more words. One or more words may include, without limitation, strings of one or more characters, including without limitation any sequence or sequences of letters, numbers, punctuation, diacritic marks, engineering symbols, geometric dimensioning and tolerancing (GMT) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Still referring to FIG. 1, language processing module may operate to produce a language processing model. Language processing model may include a program automatically generated by computing device and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

Still referring to 1, language processing module and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module may use a corpus of documents to generate associations between language elements in a language processing module, and diagnostic engine may then use such associations to analyze words extracted from one or more documents and determine that the one or more documents indicate significance of a category. In an embodiment, language module and/or [computing device] may perform this analysis using a selected set of significant documents, such as documents identified by one or more experts as representing good information; experts may identify or enter such documents via graphical user interface, or may communicate identities of significant documents according to any other suitable method of electronic communication, or by providing such identity to other persons who may enter such identifications into [computing device]. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

In an embodiment, and still referring to FIG. 1, at least a processor 104 may train machine-learning model 132 using multi-task learning. As used herein, multi-task learning (MTL) is a subfield of machine learning in which multiple learning tasks are solved at the same time, while exploiting commonalities and differences across tasks. This may result in improved learning efficiency and prediction accuracy for the task-specific models, when compared to training models separately.

Referring still to FIG. 1, producing schema 124 further comprises receiving a current criterion element. As used in this disclosure a "current criterion element" is a new and/or current criterion element that differs from criterion element 116. For example, and without limitation, current criterion element may denote a new medical prognosis, new drug, new therapeutic, and the like thereof. At least a processor 104 may update machine-learning model 132 as a function of the current criterion element and produce schema 124 as a function of the updated machine-learning model.

Continuing to refer to FIG. 1, schema 124 may be configured to present a plurality of queries. As used in this disclosure a "query" is a question and/or proposition that may guide a user and/or medical professional along the schema and/or decision tree. For example, and without limitation, the plurality of queries may ask questions that at least increase the statistical probability of being correct. For example, and without limitation, a query may comprise one or more questions relating to increasing the statistical probability for being correct in prescribing oxycodone and/or for diagnosing an injury. Schema 124 may then receive a plurality of rejoinders as a function of the plurality of queries. In an embodiment, and without limitation, at least a processor 104 may receive a plurality of rejoinders as a function of the plurality of queries. As used in this disclosure a "rejoinder" is an answer and/or acknowledgement to the plurality of queries. For example, plurality of rejoinders may include answers in the form of true/false, yes/no, written text, multiple choice, and the like thereof. After the plurality of rejoinders are received, schema 124 then determines an outcome as a function of the plurality of rejoinders. In an embodiment, and without limitation, schema 124 may be configured to determine an outcome as a function of the plurality of rejoinders. As used in this disclosure an "outcome" is an endpoint reached at the end of a decision tree. For example, and without limitation, outcome may denote an approval for a prior authorization for a medical procedure being approved. As a further non-limiting example, outcome may denote a rejection in prescribing a particular drug. As a further non-limiting example, outcome may denote a plurality of additional queries are required to increase the statistical probability of being correct.

Still referring to FIG. 1, identifying template preference 120 may include the use of a web crawler. As used in this disclosure, a "web crawler" is a spider or spiderbot in an Internet bot that systematically browses the World Wide Web and is typically operated by search engines, such as Google, Yahoo, etc. Web search engines get their information by web crawling from site to site. The "spider" checks for the standard filename robots.txt, addressed to it. The robots.txt file contains directives for search spiders, telling it which pages to crawl. After checking for robots.txt and either finding it or not, the spider sends certain information back to be indexed depending on many factors, such as the titles, page content, JavaScript, Cascading Style Sheets (CSS), headings, or its metadata in HTML meta tags. After a certain number of pages crawled, amount of data indexed, or time spent on the website, the spider stops crawling and moves on. In an embodiment, a web crawler may also be used to receive criterion element 116 and train at least a training example 136.

Figure 2:
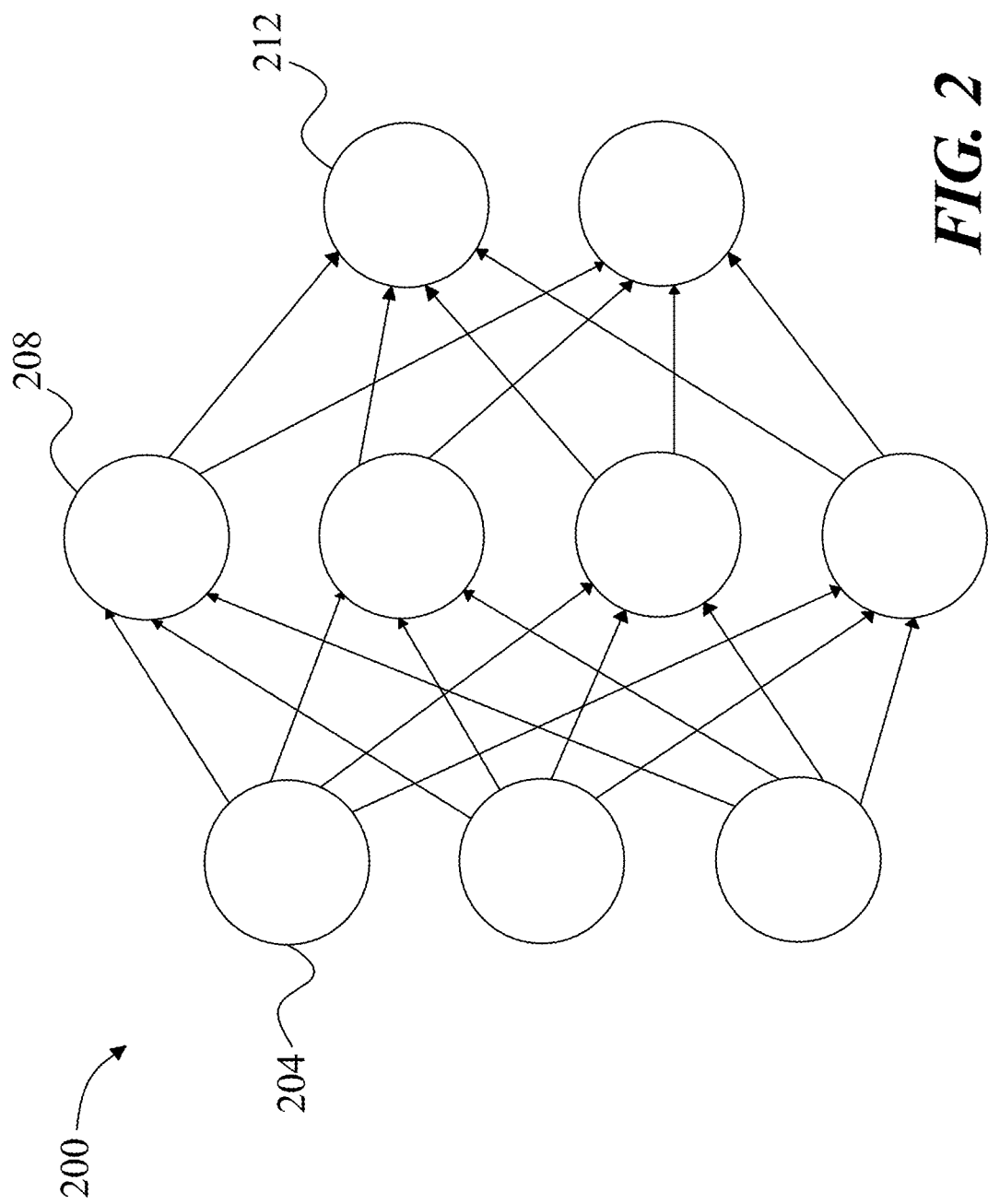
FIG. 2 is a schematic diagram illustrating an exemplary embodiment of a neural network.

Referring now to FIG. 2 an exemplary embodiment of neural network 200 is illustrated. Neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 204, one or more intermediate layers 208, and an output layer of nodes 212. Connections between nodes may be created via the process of "training" the network, in which elements from a training dataset are applied to input nodes 204, a suitable training algorithm (such as Levenberg-Marquardt, conjugate gradient, simulated annealing, or other algorithms) is then used to adjust the connections and weights between nodes in adjacent layers 208 of the neural network to produce the desired values at output nodes 212. This process is sometimes referred to as deep learning.

Figure 3:
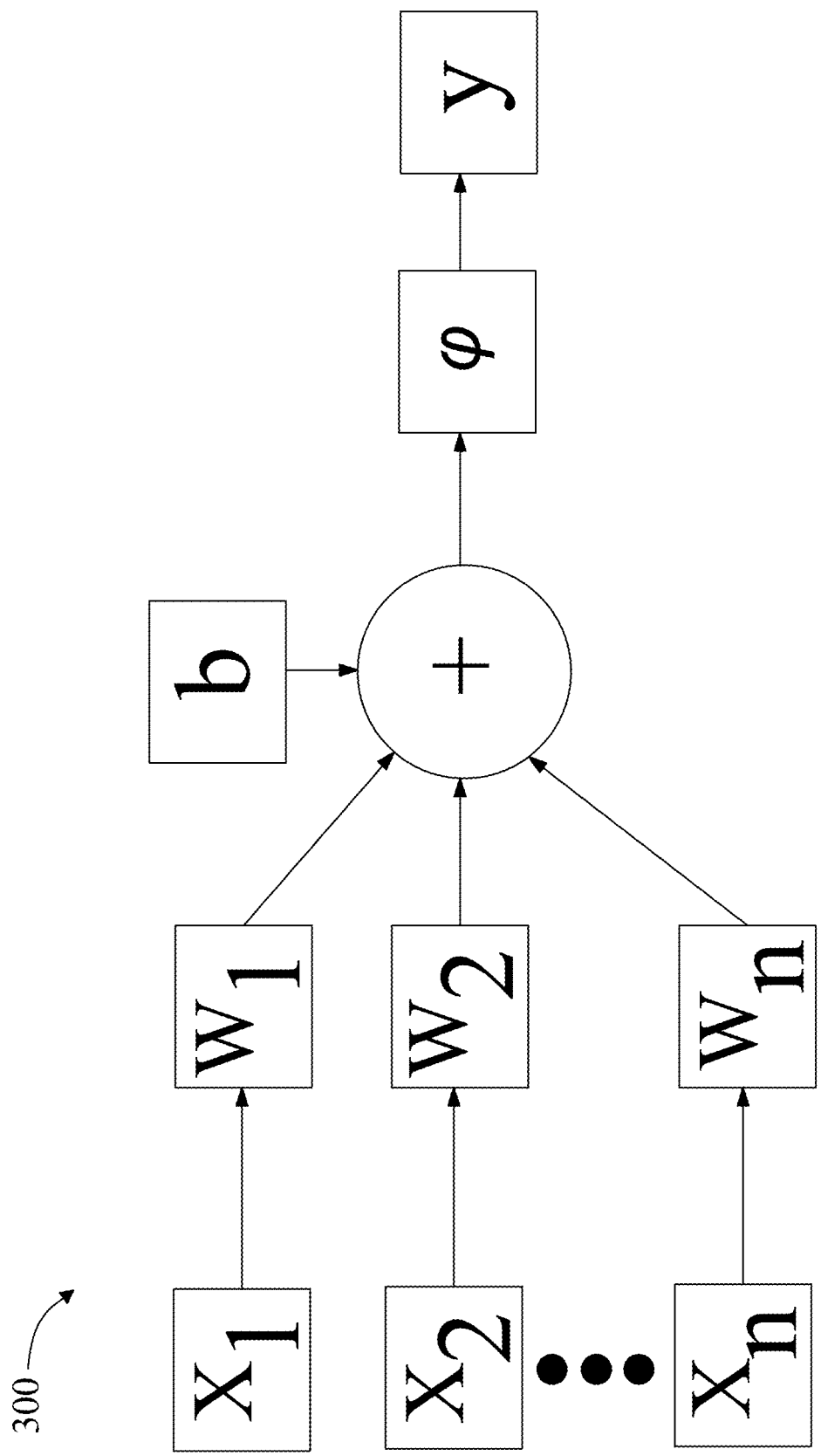
FIG. 3 is a schematic diagram illustrating an exemplary embodiment of a node of a neural network.

Referring now to FIG. 3, an exemplary embodiment of a node 300 of a neural network is illustrated. A node 300 may include, without limitation a plurality of inputs $x_i$ that may receive numerical values from inputs to a neural network containing the node and/or from other nodes. Node 300 may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Still referring to FIG. 3, a neural network may receive criterion elements as inputs and output a schema representing a probability of classification to a predetermined class according to weights $w_i$ that are derived using machine-learning processes as described in this disclosure.

Figure 4:
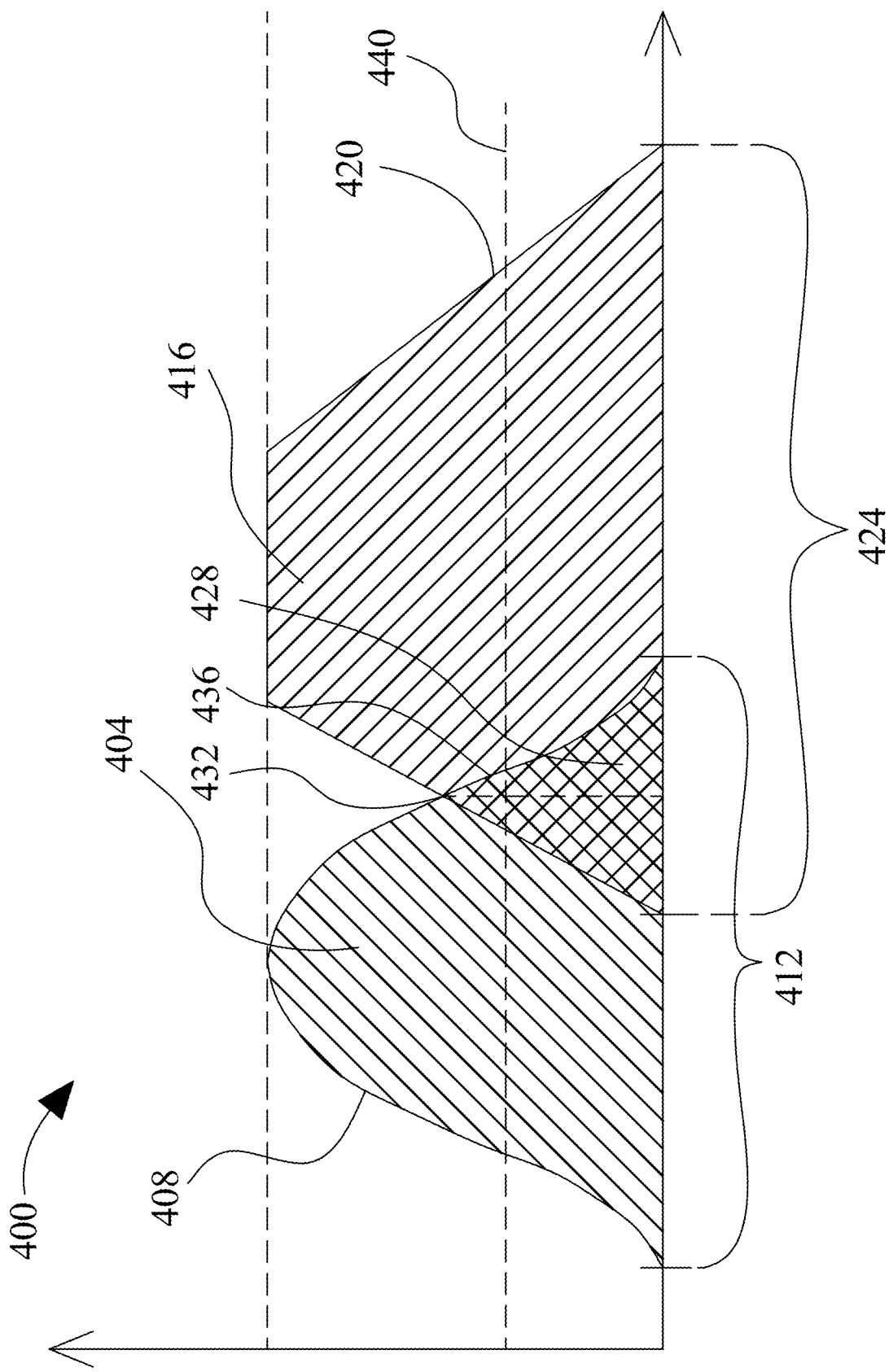
FIG. 4 is a graph representing an exemplary embodiment of a fuzzy set comparison.

Referring to FIG. 4, an exemplary embodiment of fuzzy set comparison 400 is illustrated. A first fuzzy set 404 may be represented, without limitation, according to a first membership function 408 representing a probability that an input falling on a first range of values 412 is a member of the first fuzzy set 404, where the first membership function 408 has values on a range of probabilities such as without limitation the interval [0,1], and an area beneath the first membership function 408 may represent a set of values within first fuzzy set 404. Although first range of values 412 is illustrated for clarity in this exemplary depiction as a range on a single number line or axis, first range of values 412 may be defined on two or more dimensions, representing, for instance, a Cartesian product between a plurality of ranges, curves, axes, spaces, dimensions, or the like. First membership function 408 may include any suitable function mapping first range 412 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \leq x < b \\ \frac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 4, first fuzzy set 404 may represent any value or combination of values as described above, including schema 124, a predetermined class, such as without limitation an approved class or a denied class, and/or any combination of the above. A second fuzzy set 416, which may represent any value which may be represented by first fuzzy set 404, may be defined by a second membership function 420 on a second range 424; second range 424 may be identical and/or overlap with first range 412 and/or may be combined with first range via Cartesian product or the like to generate a mapping permitting evaluation overlap of first fuzzy set 404 and second fuzzy set 416. Where first fuzzy set 404 and second fuzzy set 416 have a region 428 that overlaps, first membership function 408 and second membership function 420 may intersect at a point 432 representing a probability, as defined on probability interval, of a match between first fuzzy set 404 and second fuzzy set 416. Alternatively or additionally, a single value of first and/or second fuzzy set may be located at a locus 436 on first range 412 and/or second range 424, where a probability of membership may be taken by evaluation of first membership function 408 and/or second membership function 420 at that range point. A probability at 428 and/or 432 may be compared to a threshold 440 to determine whether a positive match is indicated. Threshold 440 may, in a non-limiting example, represent a degree of match between first fuzzy set 404 and second fuzzy set 416, and/or single values therein with each other or with either set, which is sufficient for purposes of the matching process; for instance, threshold may indicate a sufficient degree of overlap between schema 124 and a predetermined class for combination to occur as described above. Alternatively or additionally, each threshold may be tuned by a machine-learning and/or statistical process, for instance and without limitation as described in further detail below.

Further referring to FIG. 4, in an embodiment, a degree of match between fuzzy sets may be used to classify a schema 124 relating to a criterion element 116 with a predetermined class. For instance, if a schema 124 of a criterion element has a fuzzy set matching a predetermined class fuzzy set by having a degree of overlap exceeding a threshold, at least a processor 104 may classify the criterion element as belonging to the predetermined class. Where multiple fuzzy matches are performed, degrees of match for each respective fuzzy set may be computed and aggregated through, for instance, addition, averaging, or the like, to determine an overall degree of match.

Still referring to FIG. 4, in an embodiment, a schema 124 of a criterion element 116 may be compared to multiple predetermined fuzzy sets. For instance, schema 124 may be represented by a fuzzy set that is compared to each of the multiple predetermined class fuzzy sets; and a degree of overlap exceeding a threshold between the probabilistic output fuzzy set and any of the multiple predetermined class fuzzy sets may cause at least a processor 104 to classify the schema as belonging to a predetermined class. For instance, in one embodiment there may be two predetermined class fuzzy sets, representing respectively an approved class and a denied class. Approved class may have an approved class fuzzy set; denied class may have a denied class fuzzy set; and schema 124 may have a probabilistic output fuzzy set. At least a processor 104, for example, may compare a probabilistic output fuzzy set with each of approved class fuzzy set and denied class fuzzy set, as described above, and classify a schema to either, both, or neither of approved class nor denied class. Machine-learning methods as described below may, in a non-limiting example, generate coefficients used in fuzzy set equations as described above, such as without limitation x, c, and σ of a Gaussian set as described above, as outputs of machine-learning methods.

Figure 5:
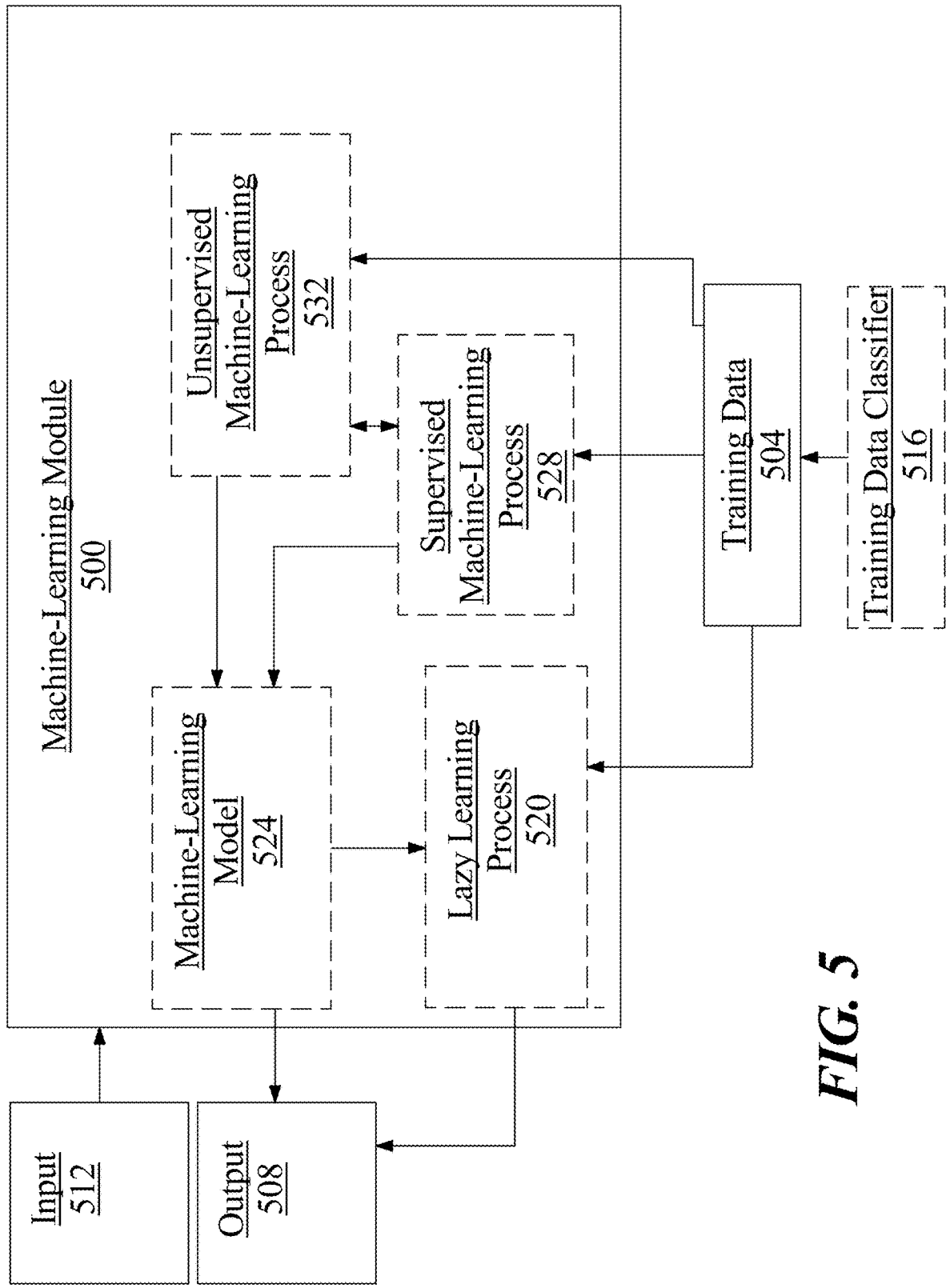
FIG. 5 is a block diagram illustrating an exemplary embodiment of a machine-learning module.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm that will be performed by a computing device/module to produce outputs 508 given data provided as inputs 512; this is in contrast to a non-machine learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example inputs of significant terms 128 may result in outputs of schemas.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 500 may generate a classifier using a classification algorithm, defined as a processes whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 516 may classify elements of training data to sub-categories of significant terms 128 such as significant medical terms, significant contract terms, significant transactional terms, and the like thereof.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 132. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include significant terms 128 as described above as inputs, schemas as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 6:
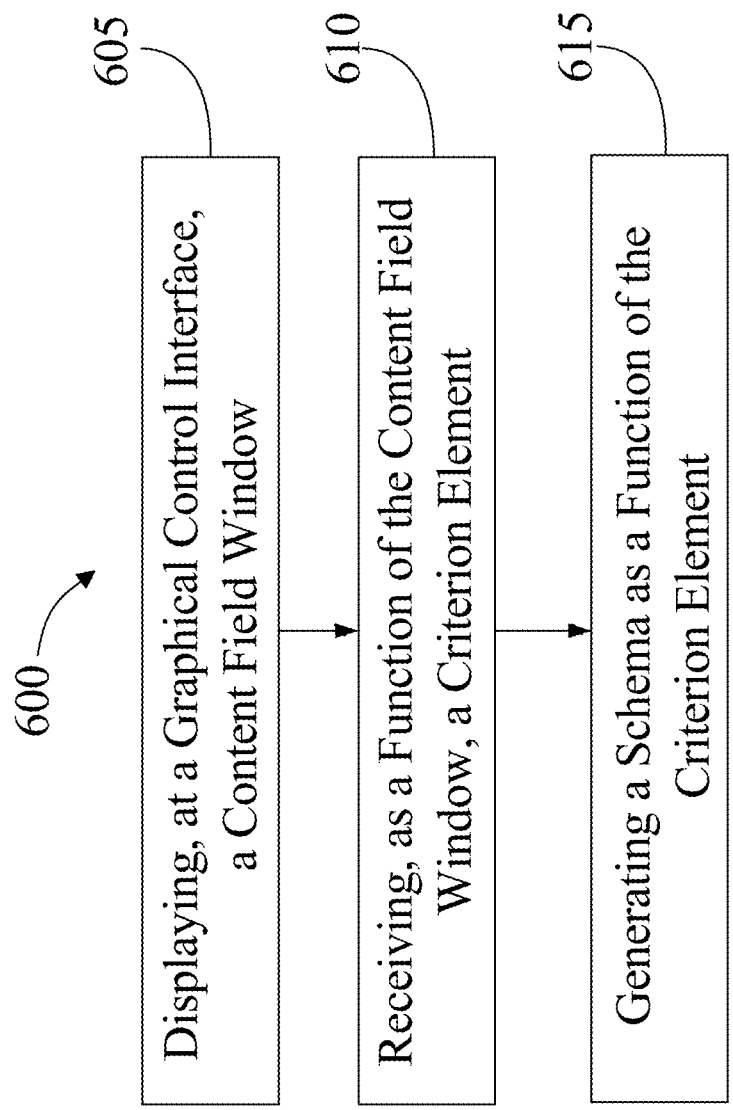
FIG. 6 is a flow diagram illustrating an exemplary embodiment of a method for generating a schema.

Referring now to FIG. 6, an exemplary embodiment of a method 600 for generating a schema. Method is performed by at least a processor 104. At least a processor 104 may be any of the processors or computing devices as described herein with reference to FIGS. 1 and 12. Schema 124 may be any of the schema as described herein with reference to FIG. 1. Still referring to FIG. 6, at step 605, method 600 includes displaying, at a graphical control interface 112, a content field window 108. Displaying a content field window 108 may include identifying a template preference 120 as a function of graphical control interface 112. Identifying the template preference 120 may include the use of a web crawler. Identifying template preference 120 further comprises presenting the graphical control interface 112 to the user, receiving a user preference, and identifying the template preference 120 as a function of the user preference. Displaying the content field window 108 further comprises generating a free-form field window. At least a processor 104 may be any of the computing device as described herein with reference to FIGS. 1 and 12. Template preference 120 may be any of the preferences as described herein with reference to FIG. 1. Graphical control interface 112 may be any of the interfaces as described herein with reference to FIG. 1. Content field window 108 may be any of the content field windows as described herein with reference to FIG. 1.

Still referring to FIG. 6, at step 610, method 600 includes receiving, as a function of the content field window 108, a criterion element 116. Criterion element 116 may be extracted from a document using optical character recognition (OCR). Receiving the criterion element 116 may include the use of a web crawler. Criterion element 116 may be received as a function of a user input. Schema is configured to present a plurality of queries, receive a plurality of rejoinders as a function of the plurality of queries, and determine an outcome as a function of the plurality of rejoinders. At least a processor 104 may be any of the computing device as described herein with reference to FIGS. 1 and 12. Content field window 108 may be any of the content field windows as described herein with reference to FIG. 1. Criterion element 116 may be any of the elements as described herein with reference to FIG. 1.

Still referring to FIG. 6, at step 615, method 600 includes generating a schema 124 as a function of the criterion element 116. Generating schema 124 further comprises identifying at least a significant term 128 as a function of criterion element 116, receiving at least a training example 136, training a machine-learning model 132 as a function of the at least a training example 136, and generating schema 124 as a function of criterion element 116 and machine-learning model 132. Receiving the at least a training example 136 includes the use of a web crawler. At least a processor 104 may be any of the computing device as described herein with reference to FIGS. 1 and 12. Criterion element 116 may be any of the elements as described herein with reference to FIG. 1. Schema 124 may be any of the schema as described herein with reference to FIG. 1. Machine learning model may be any of the machine learning models as described herein with reference to FIGS. 1 and 5.

Figure 7:
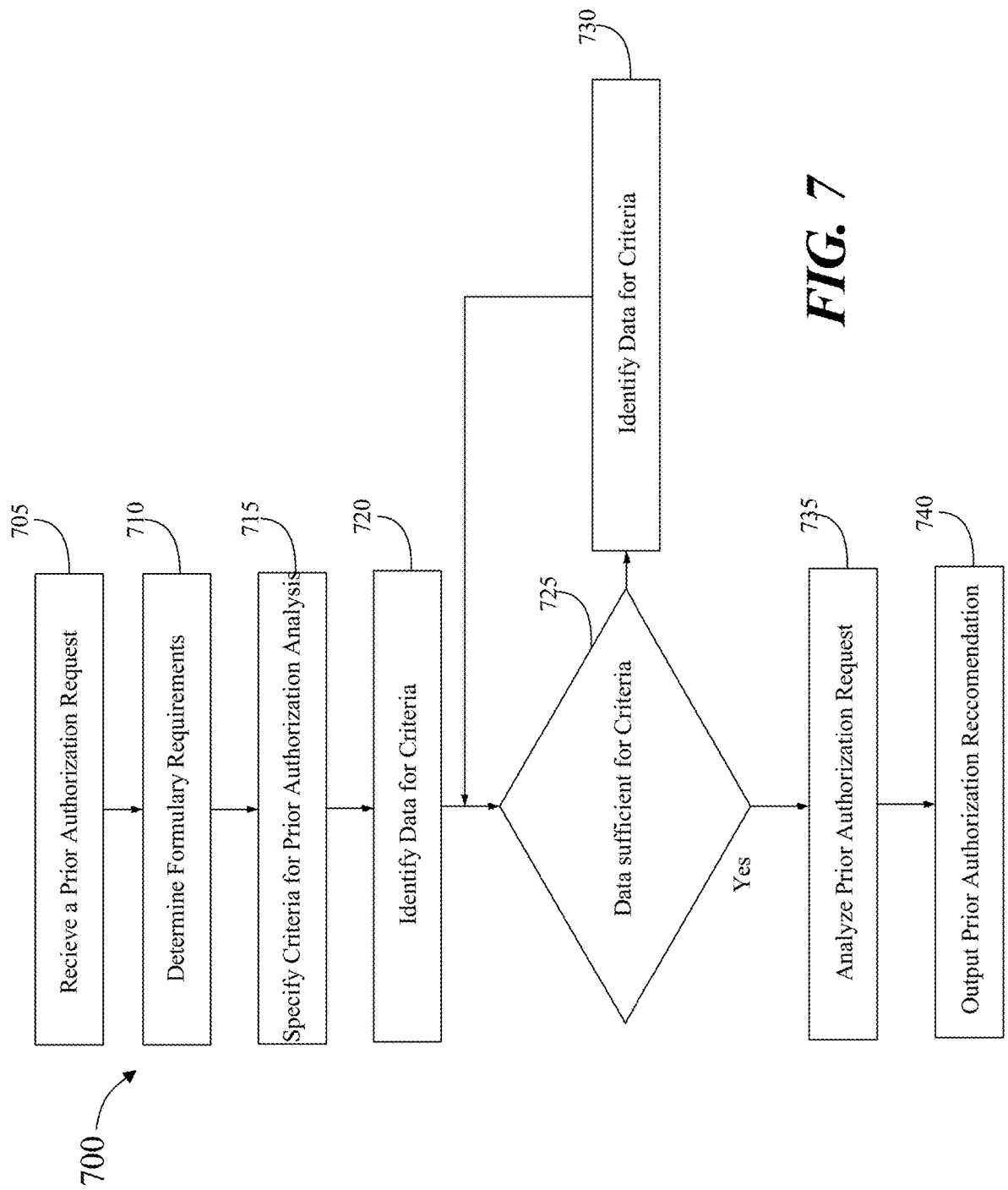
FIG. 7 is a flow diagram illustrating an exemplary application according to some embodiments of the invention.

Now referring to FIG. 7, an exemplary application according to some embodiments of the invention of a method 700. As described above, schema 124 may aid in identifying prior authorization of a medical procedure and/or prescription as a function of a decision tree and statistical probability. Method 700 may be a method for outputting a prior authorization recommendation. As used herein, a "prior authorization recommendation" is a recommendation of a medical procedure and/or prescription to be given/performed on the user. Outcome, as explained above, may denote an approval for a prior authorization for a medical procedure being approved.

Continuing to refer to FIG. 7, at step 705, at least a processor 104 receives a prior authorization request. As used in this disclosure, a "prior authorization request" is information transmitted from a user to the computing device asking the computing device to generate a prior authorization recommendation. Prior authorization request, for example, may be received from a user device. In some cases, prior authorization request may include information about a patient's medical insurance plan. Furthermore, at step 710, prior authorization request may be used to determine formulary requirements affecting a patient. As used in this disclosure "formulary" refers to an enumeration of interventions (e.g., medical tests, medications, surgeries, etc.) that may be classified according to tier. For example, information about the patient's medical insurance plan in some cases is used to determine formulary requirements, at step 710. Formulary requirements may include at least a criterion related to payor coverage (e.g., authorization) of an intervention.

Still referring to FIG. 7, at step 715, at least a processor 104 may specify at least a criterion associated with prior authorization request. At least a criterion may include any criteria or criterion described above. In some embodiments, at least a criterion may be used to determine a plurality of analytical constraints, sometimes called features. Determination of an association between at least a criterion and analytical constraints may be determined manually or by way of any of machine-learning methods described in this disclosure. In some exemplary cases, a mapping of at least a criterion to analytical constraints may be performed using training data, such as previous prior authorization requests, which may be correlated to deterministic outcomes such as actual payor determinations for the previous prior authorization requests. Referring still to FIG. 7, at step 720, computing 104 may identify available data related to at least a criterion. Identified data, in some cases, may be identified from prior authorization request and/or plan information. In some embodiments, at least a processor 104 may attempt to satisfy specified at least a criterion by using available data. In some cases, available data may include a plurality of analytical constraints. Analytical constraints may include any analytical constraints, as described above.

Still referring to FIG. 7, at step 725, at least a processor 104 may decide if available data is sufficient to satisfy specified at least a criterion. In some cases, step 725 may include ensuring that an analytical constraint corresponds to each analytical parameter of a plurality of parameters. If it is determined that available data is not sufficient to satisfy at least a criterion, step 730 may be performed by at least a processor 104. Step 730 may further include interrogating for additional data related to at least a criterion. In some cases, additional data may include one or more analytical constraints. In some embodiments, as additional data is submitted, additional data may be made available to at least a processor 104, thereby becoming available data. Step 725 may be repeated until available data is sufficient to satisfy at least a criterion.

At step 735, at least a processor 104 analyzes prior authorization request using at least a criterion and machine learning model 128. In some cases, step 735 may include generating a probabilistic output, as described above, and/or filtering a schema, as described above. Finally, at step 740, as a result of step 735, a prior authorization recommendation is output. In some cases, prior authorization recommendation may include a confidence output. Confidence output may include a probability related to system's confidence of prior authorization recommendation. Confidence output may include any confidence output, described above.

Continuing with reference to FIG. 7, in some cases, prior authorization may include a denial of prior authorization. A "denial of prior authorization" means the user is not eligible to receive prior authorization from at least a processor 104. In cases of denial of prior authorization, method 700 may additionally include a step for suggesting alternative intervention. For example, in some cases a denial may of a higher tier intervention may include a recommendation, with approval, for a lower tier intervention, such as without limitation a step therapy.

Figure 8:
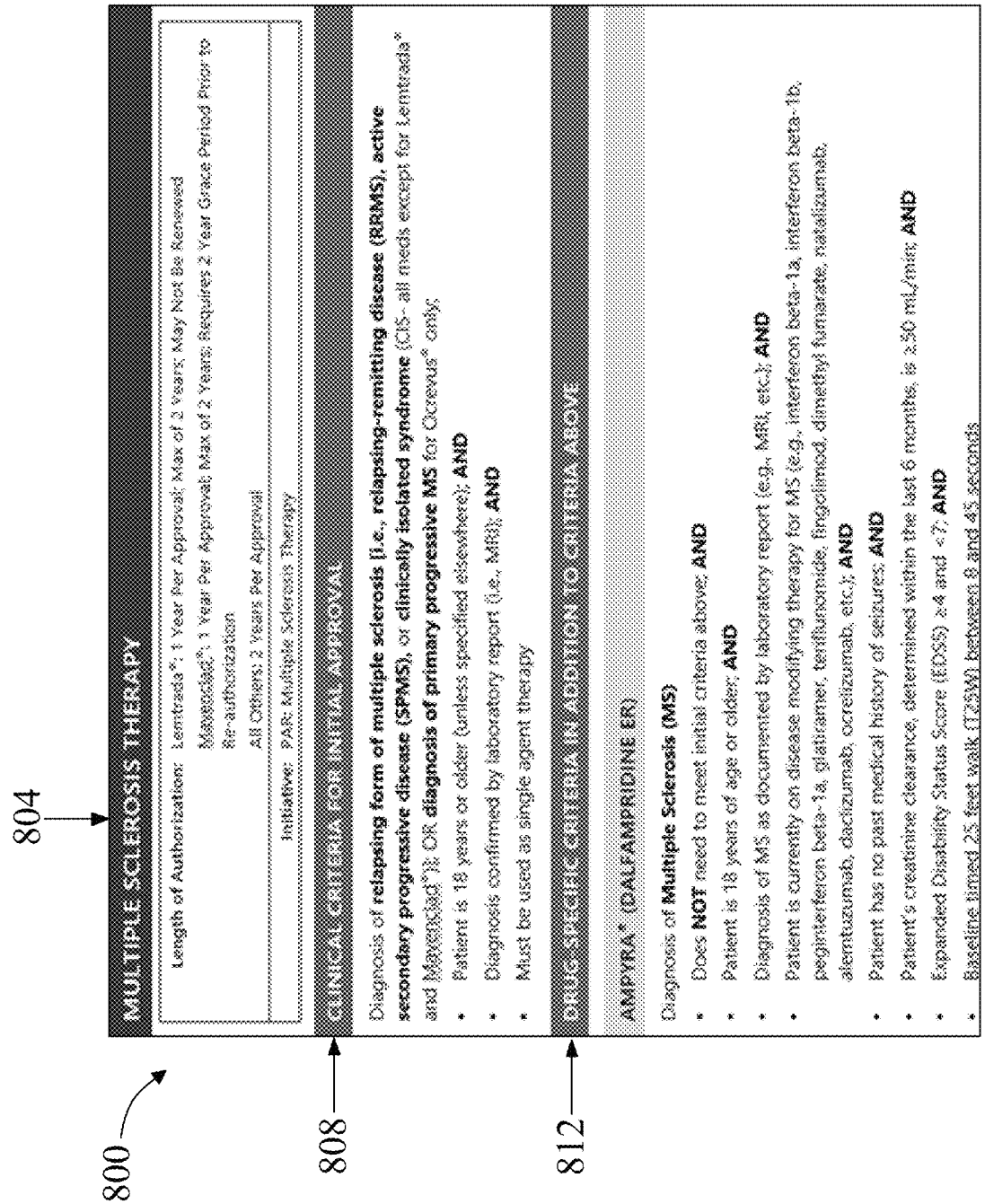
FIG. 8 is a screenshot illustrating an exemplary embodiment of a criterion element.

Now referring to FIG. 8, an exemplary embodiment 800 of a criterion element 116 is illustrated. In an embodiment, and without limitation, criterion element 116 may include an ailment criterion 804. As used in this disclosure an "ailment criterion" is an element of datum denoting a parameter and/or identifier associated with an ailment. For example, and without limitation, ailment criterion 804 may denote criterion associated with multiple sclerosis. In an embodiment, and without limitation, criterion element 116 may include a clinical criterion 808. As used in this disclosure a "clinical criterion" is an element of datum denoting a parameter and/or identifier associated with a clinical history and/or medical record. For example, and without limitation, clinical criterion 808 may denote that an individual must be older than 18 years old, have a confirmatory diagnosis by laboratory report, and must be used as a single agent therapy. In an embodiment, and without limitation, criterion element 116 may include a drug criterion 812. As used in this disclosure a "drug criterion" is an element of datum denoting a parameter and/or identifier associated with a drug and/or compound. For example, and without limitation, drug criterion 812 may denote that the drug should only be prescribed when the diagnosis of multiple sclerosis is documented, when the patient has no history of seizures, when the patient's creatinine clearance is greater than or equal to 50 mL/min, and the like thereof.

Figure 9:
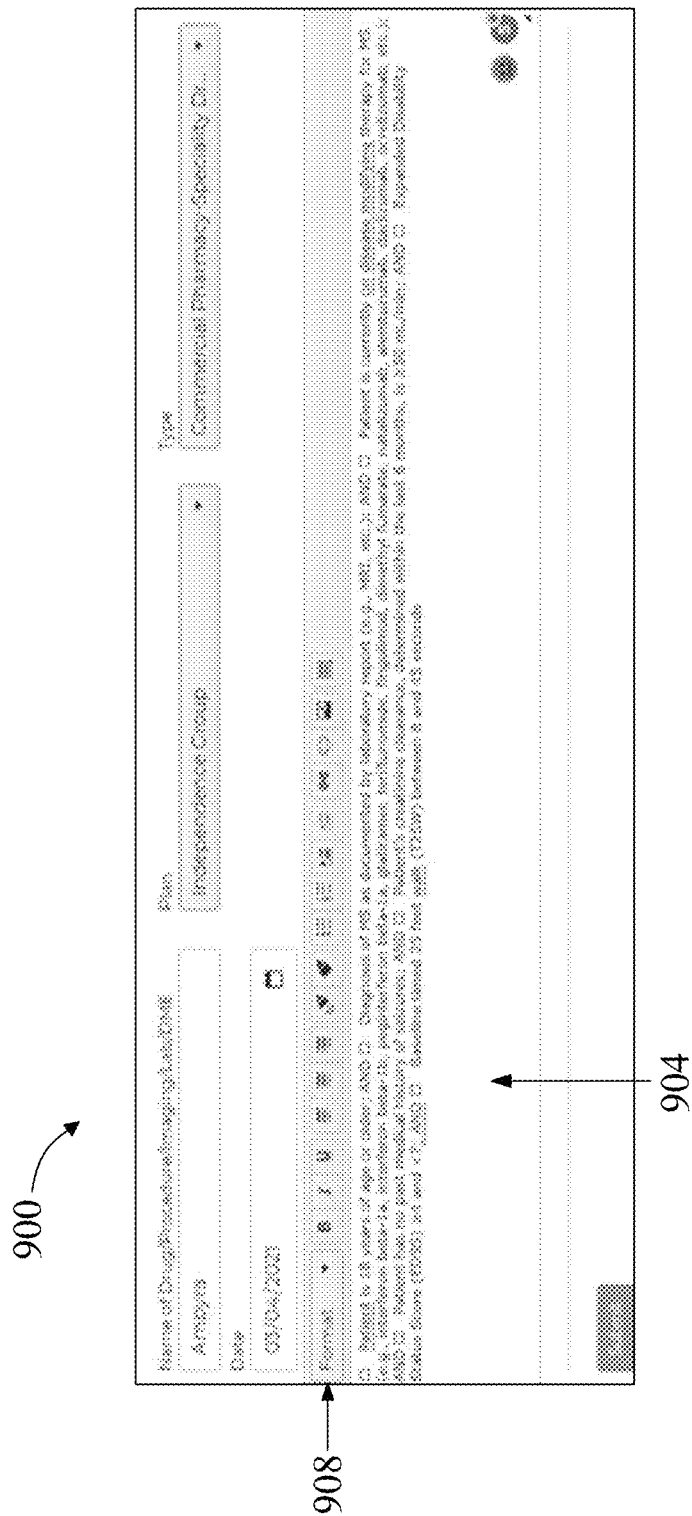
FIG. 9 is a screenshot illustrating an exemplary embodiment of a free-form field window.

Now referring to FIG. 9, an exemplary embodiment 900 of a free-form field window is illustrated. In an embodiment and without limitation, free-form field window may include a text box 904. As used in this disclosure a "text box" is graphical representation denoting a rectangle and/or square shape with a border separating the graphical representation from the remaining graphical content field window. For example, and without limitation, text box 904 may include a scrollbar, text cursor, and the like thereof. As a further non-limiting example, text box 904 may include one or more fields to enter a plurality of languages such as English, Spanish, French, Chinese, Japanese, German, and the like thereof. In an embodiment and without limitation, free-form field window may denote a plurality of text modifiers 908. As used in this disclosure a "text modifier" is an operation that modifies and/or alters a text and/or sequence of text in text box 904. For example, and without limitation, text modifier 908 may include one or more modifiers such as a bold modifier, italic modifier, alignment modifier, bullet point modifier, hyperlink modifier, and the like thereof.

Figure 10:
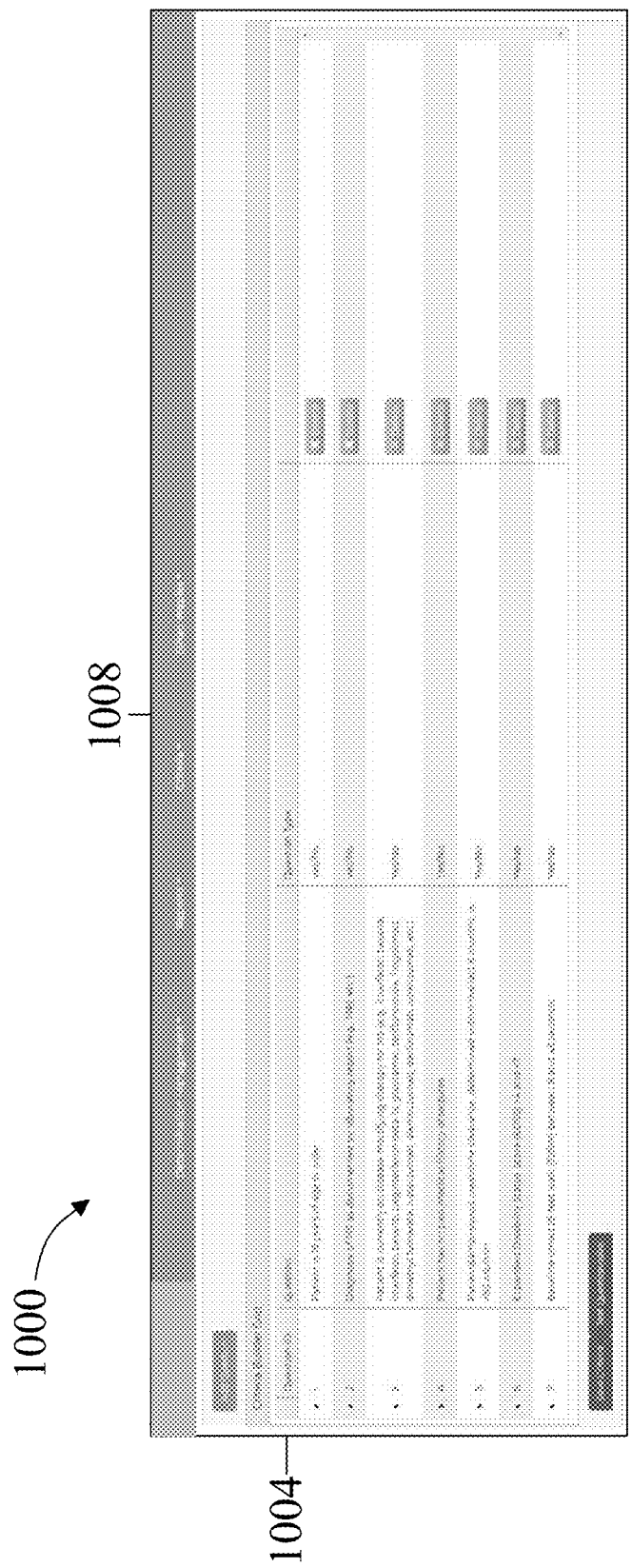
FIG. 10 is a screenshot illustrating an exemplary embodiment of a plurality of queries.

Now referring to FIG. 10, an exemplary embodiment 1000 of a plurality of queries is illustrated. Plurality of queries may include a question identification (ID) 1004. As used in this disclosure a "question identification (ID)" is a symbol and/or representative identifier associated with a query of the plurality of queries. For example, and without limitation question ID 1004 may denote a numeric identifier such as question 1, 2, 3, 4, 5, and the like thereof. As a further non-limiting example question ID 1004 may denote an alphabetical identifier such as question a, b, c, d, and the like thereof. In an embodiment and without limitation, plurality of queries may include a question type 1008. As used in this disclosure a "question type" is a form of a question that limits a response. For example, and without limitation question type 1008 may include questions in the form of true/false, yes/no, written text, multiple choice, and the like thereof.

Figure 11:
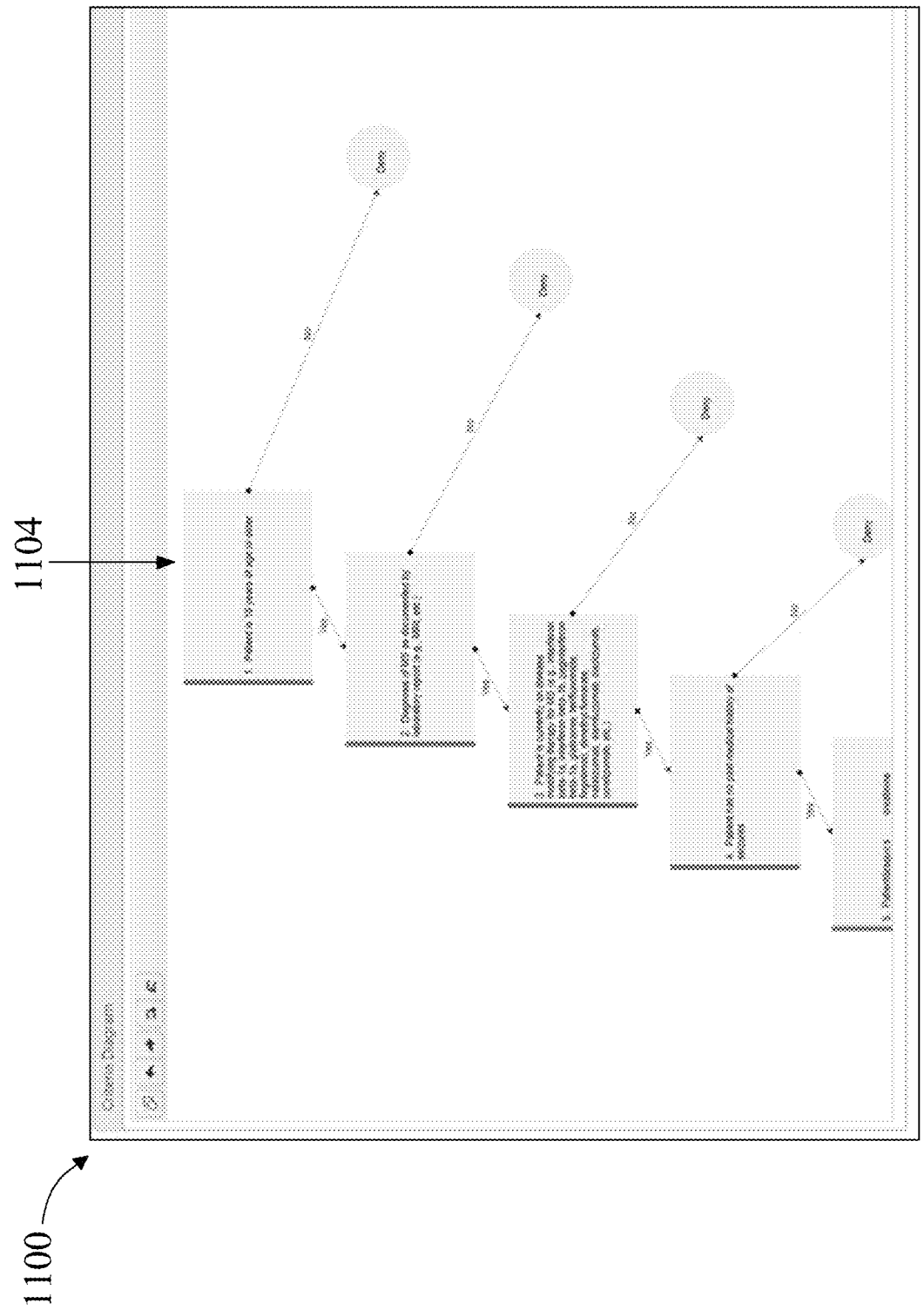
FIG. 11 is a screenshot illustrating an exemplary embodiment of a schema.

Now referring to FIG. 11, an exemplary embodiment 1100 of schema 124 is illustrated. Schema 124 may include a decision tree 1104. As used in this disclosure a "decision tree" is a tree-like model of decisions and their possible consequences. For example, and without limitation, decision tree 1104 may include probabilistic outcomes, resource costs, utilities, and the like thereof. As a further non-limiting example, decision tree 1104 may include a plurality of nodes such as, but not limited to, decision nodes, chance nodes, end nodes, and the like thereof. In an embodiment, decision tree 1104 may guide and/or advise a user and/or medical professional in determining a decision, identifying a medical treatment, identifying a necessary drug, and the like thereof. In an embodiment, and without limitation, decision tree 1104 may include a model of decisions as a function of a yes/no path. For example and without limitation, a user and/or medical professional may answer yes or no to a particular query, wherein the decision tree may guide the user and/or medical professional along the tree to reach an end node.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 12:
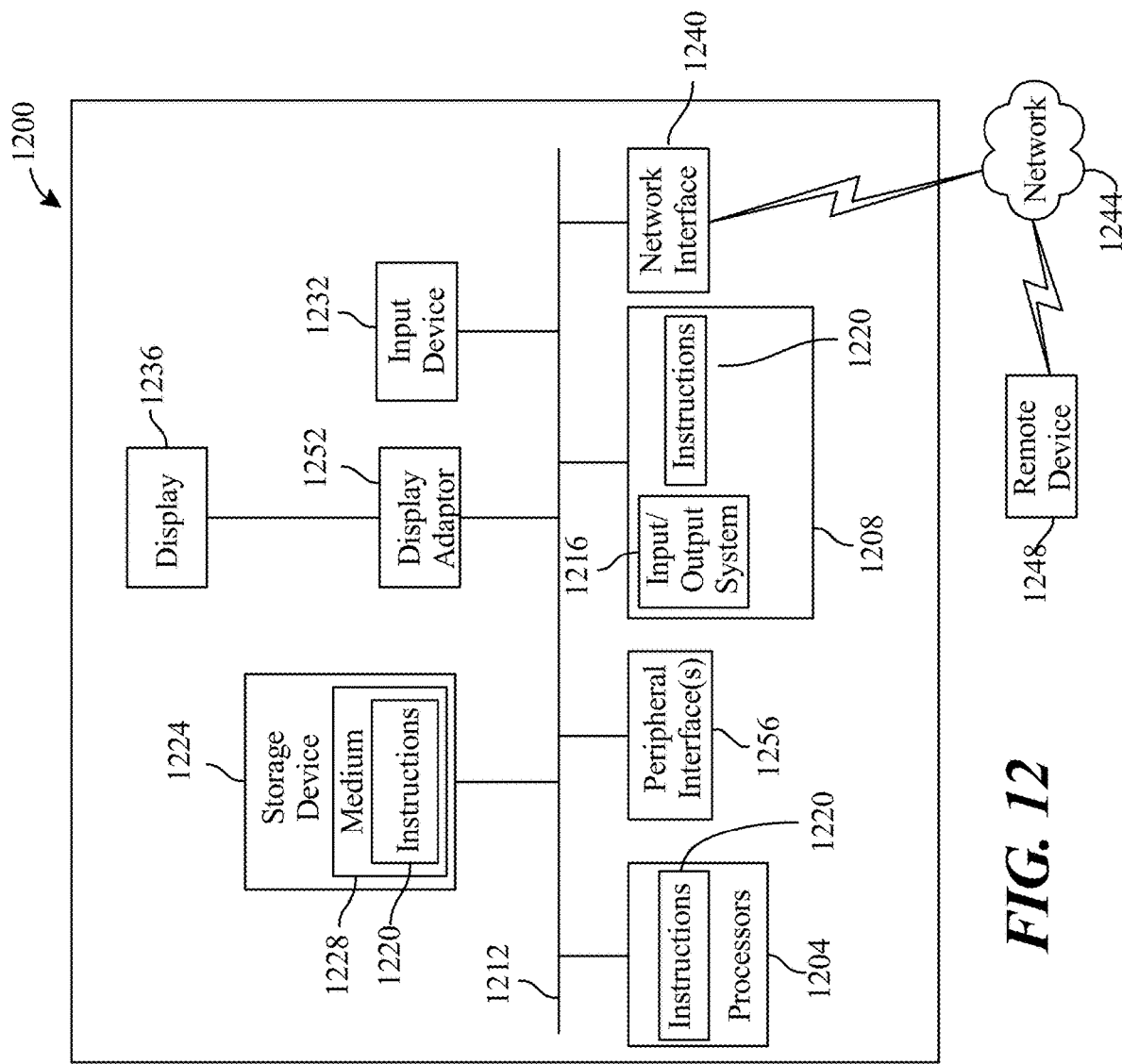
FIG. 12 is a block diagram of a computing system that can be used to implement any one or more of the methodologies disclosed herein and any one or more portions thereof.

FIG. 12 shows a diagrammatic representation of one embodiment of a computing device in the exemplary form of a computer system 1200 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1200 includes a processor 1204 and a memory 1208 that communicate with each other, and with other components, via a bus 1212. Bus 1212 may include any of several types of bus structures including, but not limited to, a memory bus, a memory controller, a peripheral bus, a local bus, and any combinations thereof, using any of a variety of bus architectures.

Processor 1204 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1204 may be organized according to Von Neumann and/or Harvard architecture as a non-limiting example. Processor 1204 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 1208 may include various components (e.g., machine-readable media) including, but not limited to, a random-access memory component, a read only component, and any combinations thereof. In one example, a basic input/output system 1216 (BIOS), including basic routines that help to transfer information between elements within computer system 1200, such as during start-up, may be stored in memory 1208. Memory 1208 may also include (e.g., stored on one or more machine-readable media) instructions (e.g., software) 1220 embodying any one or more of the aspects and/or methodologies of the present disclosure. In another example, memory 1208 may further include any number of program modules including, but not limited to, an operating system, one or more application programs, other program modules, program data, and any combinations thereof.

Computer system 1200 may also include a storage device 1224. Examples of a storage device (e.g., storage device 1224) include, but are not limited to, a hard disk drive, a magnetic disk drive, an optical disc drive in combination with an optical medium, a solid-state memory device, and any combinations thereof. Storage device 1224 may be connected to bus 1212 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1224 (or one or more components thereof) may be removably interfaced with computer system 1200 (e.g., via an external port connector (not shown)). Particularly, storage device 1224 and an associated machine-readable medium 1228 may provide nonvolatile and/or volatile storage of machine-readable instructions, data structures, program modules, and/or other data for computer system 1200. In one example, software 1220 may reside, completely or partially, within machine-readable medium 1228. In another example, software 1220 may reside, completely or partially, within processor 1204.

Computer system 1200 may also include an input device 1232. In one example, a user of computer system 1200 may enter commands and/or other information into computer system 1200 via input device 1232. Examples of an input device 1232 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1232 may be interfaced to bus 1212 via any of a variety of interfaces (not shown) including, but not limited to, a serial interface, a parallel interface, a game port, a USB interface, a FIREWIRE interface, a direct interface to bus 1212, and any combinations thereof. Input device 1232 may include a touch screen interface that may be a part of or separate from display 1236, discussed further below. Input device 1232 may be utilized as a user selection device for selecting one or more graphical representations in a graphical interface as described above.

A user may also input commands and/or other information to computer system 1200 via storage device 1224 (e.g., a removable disk drive, a flash drive, etc.) and/or network interface device 1240. A network interface device, such as network interface device 1240, may be utilized for connecting computer system 1200 to one or more of a variety of networks, such as network 1244, and one or more remote devices 1248 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1244, may employ a wired and/or a wireless mode of communication. In general, any network topology may be used. Information (e.g., data, software 1220, etc.) may be communicated to and/or from computer system 1200 via network interface device 1240.

Computer system 1200 may further include a video display adapter 1252 for communicating a displayable image to a display device, such as display device 1236. Examples of a display device include, but are not limited to, a liquid crystal display (LCD), a cathode ray tube (CRT), a plasma display, a light emitting diode (LED) display, and any combinations thereof. Display adapter 1252 and display device 1236 may be utilized in combination with processor 1204 to provide graphical representations of aspects of the present disclosure. In addition to a display device, computer system 1200 may include one or more other peripheral output devices including, but not limited to, an audio speaker, a printer, and any combinations thereof. Such peripheral output devices may be connected to bus 1212 via a peripheral interface 1256. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve systems and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating a schema, the apparatus comprising:
   at least a processor; and
   a memory communicatively connected to the at least a processor, the memory containing instructions configuring the at least a processor to:
      display, at a graphical control interface, a content field window, wherein the content field window comprises a decision tree and a structured field window comprising a plurality of structured models and guidelines for a user to input medical information;
      receive, as a function of the content field window, a criterion element, wherein the criterion element comprises at least a treatment plan for a medical condition of a patient and a time period required to treat the medical condition, wherein the criterion element further comprises:
         an ailment criterion associated with the medical condition of the patient
         a clinical criterion, wherein the clinical criterion comprises an age restriction on the patient and proof of a confirmatory diagnosis of the patient by a laboratory report; and
         a drug criterion, wherein the drug criterion comprises a chemical clearance threshold for the patient; and
      generate a schema comprising at least a confidence interval between one or more courses of action as a function of the criterion element, wherein generating the schema further comprises:
         identifying at least a significant term as a function of the criterion element;
         receiving at least a training example;
         training a machine-learning model as a function of the at least a training example;
         generating the schema as a function of the criterion element and the machine-learning model; and
         producing an updated schema as a function of a current criterion element;
            wherein the machine-learning model is updated as a function of the current criterion element to produce the updated schema, wherein the updated schema comprises a decision tree including probabilistic outcomes and resource costs.

2. The apparatus of claim 1, wherein the criterion element is extracted from a document using optical character recognition (OCR).

3. The apparatus of claim 1, wherein displaying the content field window includes identifying a template preference as a function of the graphical control interface.

4. The apparatus of claim 3, wherein identifying the template preference includes the use of a web crawler.

5. The apparatus of claim 3, wherein identifying the template preference further comprises:
   presenting the graphical control interface to the user;
   receiving a user preference; and
   identifying the template preference as a function of the user preference.

6. The apparatus of claim 1, wherein receiving the criterion element includes the use of a web crawler.

7. The apparatus of claim 1, wherein receiving the at least a training example includes the use of a web crawler.

8. The apparatus of claim 1, wherein the criterion element is received as a function of a user input.

9. The apparatus of claim 1, wherein displaying the content field window further comprises generating a free-form field window and a decision tree comprising probabilistic outcomes.

10. The apparatus of claim 1, wherein the schema is configured to:
    present a plurality of queries;
    receive a plurality of rejoinders as a function of the plurality of queries; and
    determine an outcome as a function of the plurality of rejoinders.

11. A method for generating a schema, the method comprising:
    displaying, at a graphical control interface, a content field window, wherein the content field window comprises a decision tree and a structured field window comprising a plurality of structured models and guidelines for a user to input medical information;

receiving, as a function of the content field window, a criterion element, wherein the criterion element comprises at least a treatment plan for a medical condition of a patient and a time period required to treat the medical condition, wherein the criterion element further comprises:

an ailment criterion associated with the medical condition of the patient a clinical criterion, wherein the clinical criterion comprises an age restriction on the patient and proof of a confirmatory diagnosis of the patient by a laboratory report; and a drug criterion, wherein the drug criterion comprises a chemical clearance threshold for the patient; and generating a schema comprising at least a confidence interval between one or more courses of action as a function of the criterion element, wherein generating the schema further comprises:

identifying at least a significant term as a function of the criterion element;

receiving at least a training example;

training a machine-learning model as a function of the at least a training example;

generating the schema as a function of the criterion element and the machine- learning model; and producing an updated schema as a function of a current criterion element; wherein the machine-learning model is updated as a function of the current criterion element to produce the updated schema, wherein the updated schema comprises a decision tree including probabilistic outcomes and resource costs.

12. The method of claim 11, wherein the criterion element is extracted from a document using optical character recognition (OCR).

13. The method of claim 11, wherein displaying the content field window includes identifying a template preference as a function of the graphical control interface.

14. The method of claim 13, wherein identifying the template preference includes the use of a web crawler.

15. The method of claim 13, wherein identifying the template preference further comprises:

presenting the graphical control interface to the user;

receiving a user preference; and identifying the template preference as a function of the user preference.

16. The method of claim 11, wherein receiving the criterion element includes the use of a web crawler.

17. The method of claim 11, wherein receiving the at least a training example includes the use of a web crawler.

18. The method of claim 11, wherein the criterion element is received as a function of a user input.

19. The method of claim 11, wherein displaying the content field window further comprises generating a free-form field window and a decision tree comprising probabilistic outcomes.

20. The method of claim 11, wherein the schema is configured to:

present a plurality of queries;

receive a plurality of rejoinders as a function of the plurality of queries; and determine an outcome as a function of the plurality of rejoinders.

* * * * *